May 14, 1968
W. O. UNRUH
3,383,512
SPACE VELOCITY METER UTILIZING THE
ABERRATION OF STARLIGHT
Filed Oct. 31, 1963
2 Sheets-Sheet 1
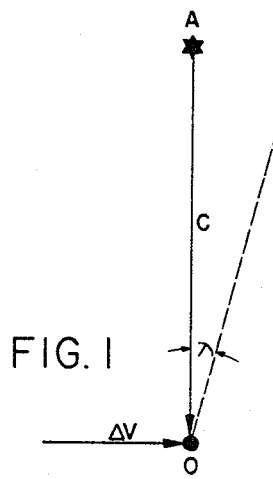
FIG. 1
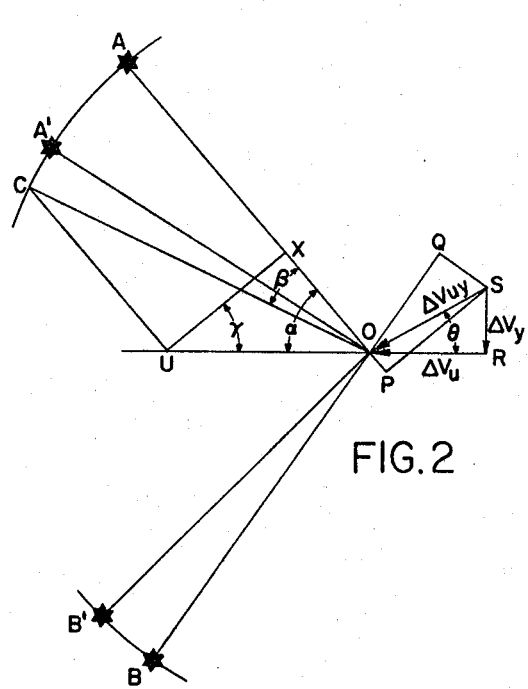
FIG. 2
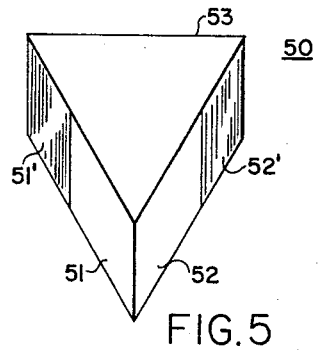
FIG. 5
FIG. 3
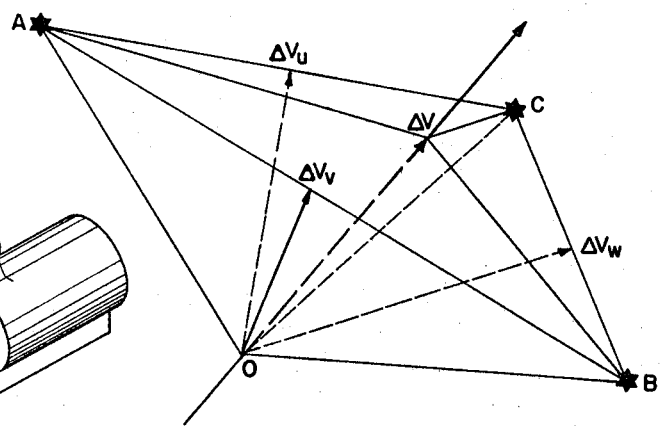
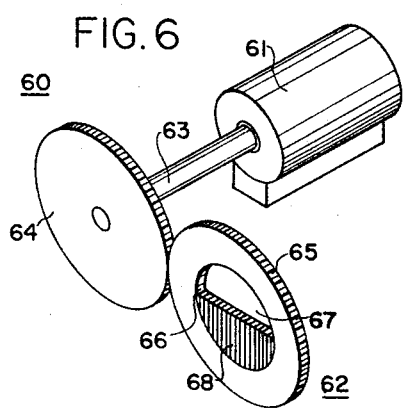
FIG. 6
INVENTOR.
WILLIS O. UNRUH
BY Roger W. Jensen
ATTORNEY May 14, 1968

W. O. UNRUH 3,383,512

SPACE VELOCITY METER UTILIZING THE
ABERRATION OF STARLIGHT

Filed Oct. 31, 1963

INVENTOR.
WILLIS O. UNRUH

BY Roger W. Jensen

ATTORNEY

United States Patent Office 3,383,512
Patented May 14, 1968

3,383,512
SPACE VELOCITY METER UTILIZING THE ABERRATION OF STARLIGHT
Willis O. Unruh, Clearwater, Fla., assignor to Honeywell Inc., a corporation of Delaware
Filed Oct. 31, 1963, Ser. No. 320,475
4 Claims. (Cl. 250—203)

This invention relates to a space velocity meter and more particularly to a device utilizing the aberration of starlight or other distant sources of light to determine the velocity of a vehicle in space.

Star aberration may be defined as an apparent motion of the star due to the relationship between the rate of propagation of light and the rate of motion of the observer. To explain more fully, an observer in space while at rest would note that a star had a particular position in relation to him, and other stars; however, if the observer moved along a line perpendicular to the line of sight of the star he would note that the star apparently moved slightly in the same direction that he was moving. If the observer were looking at the star through a telescope or some sighting device he would note that at rest his telescope was pointed in a particular direction. However, as he began to move he would have to point his telescope slightly in the direction which he was moving to keep the star in sight. The higher his velocity became the further he would have to point the telescope in the direction which he was moving in order to maintain a sight on the star. Thus, it can be seen that the angle between the at rest position of the telescope sighted on the star, and the position to which the telescope must be moved to remain sighted on the star while the observer is in motion, is directly proportional to the velocity of the observer.

It would however be impractical for an observer in space to utilize one telescope and one star to determine his velocity. Even the slightest deviation in the telescope line of sight or change in craft attitude would cause a comparatively large change in the reference to which the observer's telescope was mounted and, therefore, cause a large change in the apparent angle of the star. Thus, to utilize one telescope and one star to obtain the observer's velocity in space would require an elaborate and extremely accurate direction finding system.

In prior art devices a pair of telescopes are utilized to observe a pair of stars. By observing the angle the pair of stars make with the observer at the apex of the angle at a first time, and by observing the angle at a second time, the change of velocity of the observer can be determined from the change in the angle. It should be noted that initial velocity cannot be determined from the change of angle. The change of angle simply indicates the change of velocity which can be vectorially added to the initial velocity to give the total velocity with respect to some coordinate frame of reference. The angle between the stars is determined directly from the angle between the telescopes, or in some more sophisticated systems, the angle between the stars is determined from the angle at which the light enters each of the telescopes. In these prior art devices, if a temperature or acceleration change effects one telescope but not the other, or if one sensor changes slightly, there can be a large error in the measured readout of the apparatus. Also, in the initial alignment of the prior art devices great care must be taken in positioning the two separate telescopes in relation to each other and in relation to the stars it is desired to observe, or the starlight will not impinge upon the photo sensors properly, and the apparatus will then be useless for determining the velocity.

In the present apparatus the light from two stars separated by some known angle enters opposite sides of a colinearizing prism and emerges from the base as parallel light. First chopping means periodically allow the light from the first star to pass, and then the light from the second star is allowed to pass while the light from the first star is blocked. An electrical pickoff device, connected to the chopping means, indicates from which star the light passing through the chopping means is emanating. A lens system then focuses the light from both stars, alternately, on a rotatably mounted mechanical chopping means. The focusing means focuses the light at approximately the rotational axis of the mechanical chopping means. Thus, a spot of light appears at the rotational axis of the mechanical chopping means which is alternately emanating from one star and then the other.

While the mechanical chopper may take on a variety of configurations, in this embodiment it is illustrated as a D or Kron disc configuration. At the beginning of a velocity measurement, the light beams from both stars will be focused to produce a spot of light concentric with the rotational axis of the mechanical chopping means. As the velocity of the craft changes, the spot of light from one of these stars will be displaced slightly in a lateral direction from the rotational axis, while the attitude of the device is continuously adjusted to maintain the light spot due to the other star concentric with the rotational axis. A light detector mounted to receive all of the light passing through the mechanical chopping means will produce a steady DC signal when the light from both stars is focused directly on the rotational axis of the mechanical chopping means. However, as the spot of light from one of the stars is displaced slightly, a signal having the same frequency as the speed of rotation of the mechanical chopper will begin to appear in the output of the detector. The magnitude of this signal is an indication of the lateral displacement of the spot of light from the axis of rotation. The intensity of the light passing through the mechanical chopper will continue to increase as a function of displacement until the displacement becomes greater than one diameter of the spot.

A pickoff device is connected to the mechanical chopping means, and provides a pair of voltages in quadrature which are indicative of the position of the chopping means and thus, an indication of the position of the two light spots produced by the beams from the two stars. These signals define the instantaneous position of the mechanical chopping means in terms of a pair of orthogonal coordinates having the rotational axis as an origin and contained within the plane of the chopping means. Also, one of the coordinates is in a plane containing the lines of sight to the two stars. These quadrature signals and the signal from the detector are combined with the signal from the first chopping means in logic circuitry which provides a signal indicative of the amount and direction one of the stars has apparently moved. Adjustable optical means, which may consist of contrarotating wedges, or a laterally movable low power lens, are mounted in optical alignment with the colinearizing prism. This optical means can displace the focal point of the lens system, relative to one of the stars, in a lateral direction at the mechanical chopping means. Thus, the electrical signal from the logic circuitry is utilized to adjust the optical means until the light beams from both stars are focused at the rotational axis of the mechanical chopper. The amount of movement of the adjustable optical means required to cause the light beams from both stars to be focused at the rotational axis is a direct indication of the star aberration, and thus, the change in velocity of the craft. The optical means provides a great deal of accuracy in the invention since a large mechanical movement provides a small optical change. Thus, an extremely small optical change is very easy to measure.

By utilizing the quadrature signals from the pickoff of the mechanical chopping means, signals are obtained from electronic circuitry which are indicative of the attitude of the apparatus in space, or in relation to the two stars being observed. These signals may be utilized to maintain the attitude of the craft fixed in space or, speaking in terms of the present invention, the attitude of the device is maintained such that the beams from one of the stars always produce a spot of light concentric with the rotational axis of the mechanical chopper. Thus, the present apparatus is a self-contained space navigation system capable of providing signals indicative of the velocity and attitude of a craft in space.

Accordingly, it is an object of this invention to provide an improved control apparatus.

Another object of this invention is to provide an improved space velocity meter.

Another object of this invention is to provide a self-contained space navigation system.

These and other objects of the present invention will be understood upon consideration of the accompanying specification, claims and drawings of which:

FIGURE 1 is a pictorial diagram depicting a star aberration;

FIGURE 2 is a pictorial diagram depicting the relation of velocity to aberration due to two stars;

FIGURE 3 is a pictorial diagram depicting the relationship of the projection of a change in velocity on three reference planes to the actual change of velocity;

FIGURE 5 is a pictorial view of the colinearizing prism utilizing silver portions; and FIGURE 6 is a diagramatic view of a chopping means.

Figure 4:
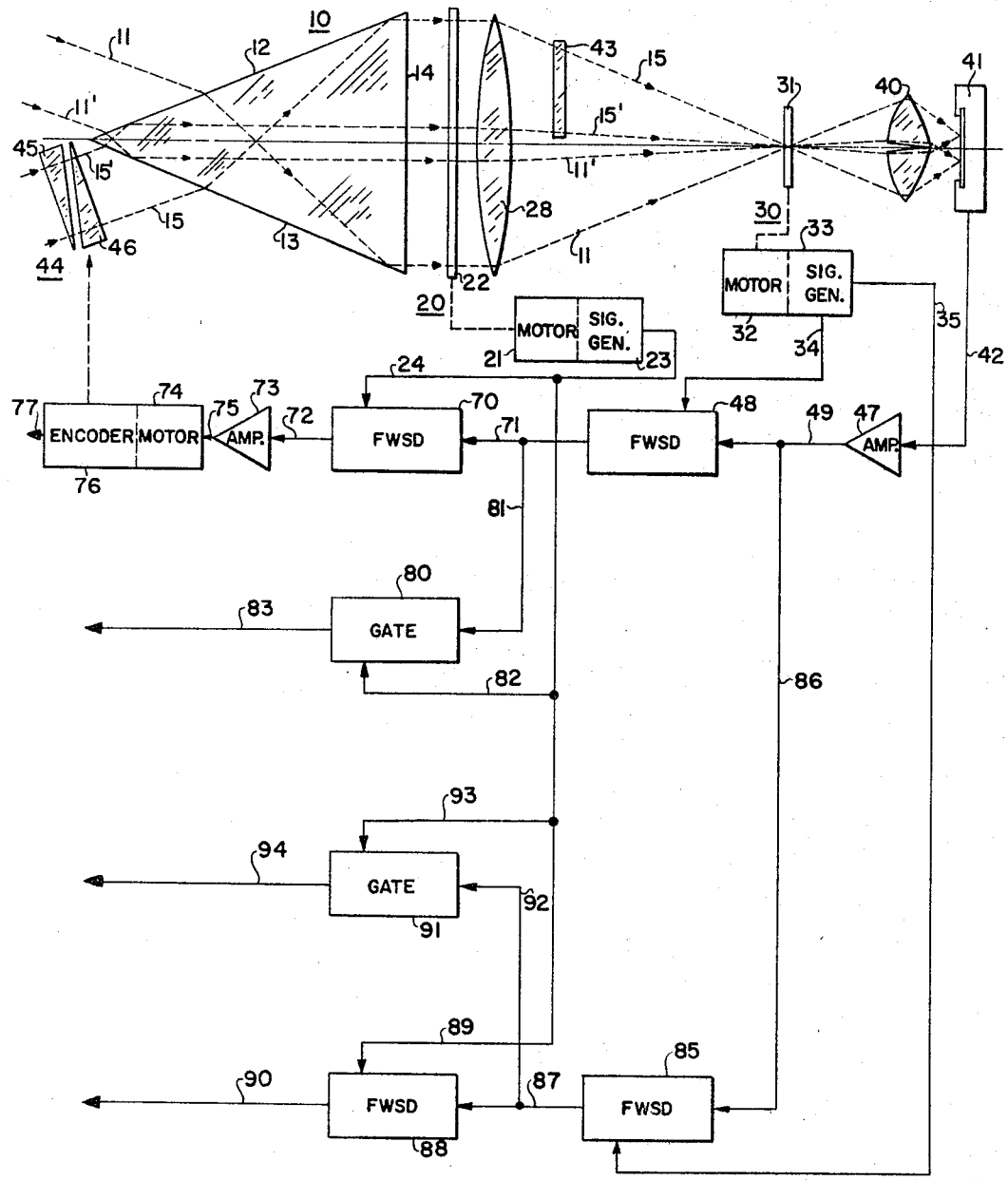
FIGURE 4 is a block diagram of the present invention.

In FIGURE 1 an observer situated at point O would see a star at position A when the observer was at rest or had some initial velocity. Assuming the observer had a velocity change of magnitude and direction equal to a vector $\Delta V$ when he was at point O, the same star would appear to be at position A'. This apparent change in position of a star due to the observer's change of velocity is known as the aberration of starlight. The angle between the two positions, A the apparent position of the star at the time of the observer's initial velocity state, and A' the apparent position at the time when the observer has experienced some change in velocity, $\Delta V$, is identified as lambda ($\lambda$) in FIGURE 1. Angle lambda is equal to the change of velocity $\Delta V$ of the observer divided by the velocity of light $c$. The vector from the star at position A to the observer's position O is denoted $c$ because this is the velocity of the light radiating from the star. It should be noted here that the angle lambda is directly proportional to the change of velocity $\Delta V$ of the observer at point O. That is, the greater the change of velocity $\Delta V$ of the observer the larger the angle lambda.

In FIGURE 2 position A and position B are the points at which an observer at position O, at rest or having some initial velocity, would see a pair of stars. $\Delta V_{uy}$ is the projection of some unknown change in the observer's initial velocity vector in the AOB plane. In this case the actual change of velocity would be $\Delta V$, but since only that component of velocity normal to the line of sight to the star is effective in producing the star aberration observed, a projection of the unknown change in the initial velocity of the observer, denoted $\Delta V_{uy}$, must be used. Positions A' and B' are the positions to which the stars at A and B respectively appear to move when the observer at point O changes his velocity in the AOB plane an amount equal to $\Delta V_{uy}$. In FIGURE 2 the line PS is the component of $\Delta V_{uy}$ normal to line AO, and line QS is the component of $\Delta V_{uy}$ normal to line BO. It should be noted in FIGURE 2 that the change in velocity $\Delta V_{uy}$ affects an apparent change in position of both stars. That is, PS is the component of velocity change $\Delta V_{uy}$ which causes the star at A to apparently shift to A' and line QS denotes the component of velocity change $\Delta V_{uy}$ which causes the star at B to apparently shift to position B'. The total angular shift between the stars originally positioned at A and B is denoted by angle AOC. FIGURE 2 is constructed so that the arc AA' is approximately equal to the line PS, the arc BB' is approximately equal to the line QS, and the arc A'C is approximately equal to the arc BB'. Thus, the arc AC is approximately equal to the line PS plus the line QS. The angle AOU denoted $\alpha$ is one half of the angle AOB. Also, line AO is equal to line OB is equal to $c$, which is the finite velocity of light. The construction of FIGURE 2 is such that angle OPS equals angle ORS equals angle OQS equals 90°, and line CU is parallel to line AO. Angle $\beta$ is the observed angular change due to aberration of both stars at positions A and B, and angle $\theta$ represents a variable used in deriving the formula below. By using the foregoing facts and simple geometry and trigonometry, it can be proven that $$\Delta V_u = \frac{\beta c}{2 \sin \alpha}$$

The vector $\Delta V_u$ denotes the component of $\Delta V_{uy}$ which is directed along the bisector OU of angle AOB.

As shown in FIGURE 3, a plurality of pairs of stars, AB, AC, and BC, may be utilized to find the projections on the three reference planes of the change of velocity of the observer in several directions. $\Delta V_v$ is shown as the projection of velocity change along the bisector of angle AOB. $\Delta V_u$ is shown as the projection of velocity change along the bisector of the angle AOC. $\Delta V_w$ is shown as the projection of velocity change along the bisector of angle BOC. Once $\Delta V_u$, $\Delta V_v$ and $\Delta V_w$ are found, $\Delta V$, the change in velocity, may be found by computation in a digital computer. $\Delta V$ is the change in velocity of an observer at point O from a first time to a second time. This change in velocity $\Delta V$ can be computed by measuring the apparent change in angles AOB, AOC, and BOC between the three stars, A, B, and C from the first time to the second time.

The observer is considered to remain at a point O even though he is traveling at some undetermined speed for a given length of time between the first reading and the second reading. Even if the observer were traveling at a rate of several hundred miles per second, the distance he would travel in a short period of time, for example five minutes, would be infinitesimal compared to the distance to the stars he is using to measure aberrations. Thus, the observer may be considered to remain at point O with no resulting depreciation of accuracy.

FIGURE 4 is a block diagram of the present invention illustrating apparatus for accurately measuring the apparent change in angle between a pair of stars due to a change in velocity of the apparatus. Light traveling from a star or other distant source follows paths 11 and 11' to surface 12 of prism 10. Paths 11 and 11' are actually one path but are illustrated in this fashion to indicate a finite width to the path before focusing. The light beams are bent toward the perpendicular upon entering surface 12 and strike surface 13 where they are internally reflected in a manner to leave the prism 10 through the base 14 and approximately perpendicular thereto. The pictorial view of a prism designated numeral 50 is illustrated in FIGURE 5. The prism 50 shown in FIGURE 5 is a slightly different embodiment than the prism 10 shown in FIGURE 4, in that one-half of the sides receiving light are silvered to enhance the internal reflection. That is, side 51 on prism 50 has a half silvered portion 51' and side 52 has a half silvered portion 52'. Thus, light entering through the clear portion 51 of prism 50 is internally reflected from the silvered portion 52' through the base 53. Light entering through the transparent portion 52 of prism 50 is reflected from the half silvered portion 51' through the base 53. Whether the sides of the prism are half silvered, as in FIGURE 5, or transparent as in FIGURE 4, the prism must be cut at such an angle that the light from the chosen stars enters the receiving side and leaves approximately perpendicular to the base.

The beams of light 11 and 11' after leaving the base 14 of prism 10, impinges upon a rotatably mounted disc 22 of a chopping means 20. Rotatably mounted disc 22 is continually rotated by motor 21. A typical chopping means 60 which may be utilized in this embodiment can be seen more clearly in FIGURE 6. In FIGURE 6, a motor 61 is shown connected to a rotatably mounted disc 62 by means of a shaft 63 and driving gear 64. Disc 62 is mounted by some means such as idler gears, not shown, and is comprised of gear teeth 65 mounted about the outer periphery in a manner to mesh with the gear teeth of gear 64. The portion of disc 62 which is actually in the light path, is a central circular portion 66 which is comprised of semicircular D shaped transparent portion 67, and semicircular D shaped opaque portion 68. It can be seen that light beams impinging upon portion 66 will be chopped at the frequency of rotation, unless such beams appear as a finite spot of light concentric with the axis of rotation. If the beams are focused into a finite spot of light concentric with the axis of rotation the intensity will be diminished by one-half, but this amount of light will be transmitted through the disc 22 continuously.

Thus, the chopping means 20 in FIGURE 4 will pass the light beams 11 and 11' approximately one-half of the time, and block them approximately one-half of the time since they impinge upon disc 22 off center. The motor 21 has a signal generator 23 attached thereto which provides an electrical signal on a lead 24 indicative of the position of the disc 22. That is, the electrical signal on lead 24 indicates whether the light beams 11 and 11' from the first star are being passed or blocked by the disc 22.

The beams of light which pass through the disc 22 of chopping means 20 are focused by a lens system 28 (shown as a single lens) into a spot of light. A second chopping means 30, also similar to chopping means 60 in FIGURE 6, has a disc 31 rotatably mounted approximately at the focal point of lens system 28. Disc 31 is mounted so that the spot of light produced by light beams 11 and 11' on disc 31 is concentric with the axis of rotation and, as will be explained more fully later, the attitude of the entire device is maintained such that this spot of light is always concentric. Thus, approximately one-half of the light in beams 11 and 11' passes through the disc 31 regardless of the rotational position thereof. A motor 32 is mechanically linked to disc 31 and continuously rotates it. Also connected to motor 32 is a signal generator 33 which provides a pair of output signals that are in quadrature (90 electrical degrees apart) on a pair of leads 34 and 35. The electrical signals on leads 34 and 35 indicate the rotary position of disc 31 in terms of a pair of orthogonal coordinates having their origin at the axis of rotation of disc 31 and contained within the plane of disc 31. The coordinate indicated by the electrical signal on lead 34 is in a plane containing the lines of sight to the two stars while the coordinate indicated by the electrical signal on lead 35 is perpendicular to that plane.

The light passing through disc 31 is focused by a lens system 40 on detecting means 41. Lens system 40 has a separate nodal point for each of the stars being observed by the system. The two nodal points are utilized to superimpose on the detecting means 41, the images of the two entrance pupils of the system. Detecting means 41 provides an electrical signal indicative of the intensity of the light applied thereto. This electrical signal appears on a lead 42.

Light from a second star is illustrated by a pair of beams 15 and 15'. Light beams 15 and 15' enter prism 10 through side 13 and are internally reflected by side 12 through base 14. The beams of light leave prism 10 approximately perpendicular to base 14. Beams 15 and 15' impinge upon disc 22 of chopping means 20 and pass through the transparent portion thereof on the alternate half cycles when beams 11 and 11' are blocked. The beams of light 15 and 15' passing through the disc 22 of chopping means 20 are focused by focusing means 28 upon the disc 31 of chopping means 30. The overall device is constructed so that at some reference velocity beams 15 and 15' are focused into a spot of light on disc 31 which is concentric with the rotational axis thereof. Thus, at zero velocity, one-half of the light in beams 15 and 15' passes through disc 31 and is focused by focusing means 40 on detecting means 41.

When the velocity of the craft, or the present apparatus, is changed, the star from which beams 15 and 15' are emanating appears to shift in position. It should be clear that both stars would appear to shift in position, but the attitude of the present device is maintained such that the first star appears to remain stationary and only the second star, emanating beams 15 and 15' appears to move. This shift in position causes the spot of light produced by the beams 15 and 15' to be displaced from the rotational axis of disc 31. As the spot of light is displaced on disc 31 a greater portion of light passes through the disc when the transparent portion of the disc 31 is positioned in the direction of displacement and less light passes through disc 31 when the opaque portion is in the direction of displacement. The farther the spot of light is displaced from the axis of rotation, the greater the intensity of light passing through the disc 31 for given periods of time. Thus, the detecting means 41 will produce a sinusoidal signal having an amplitude indicative of the amount of displacement of the spot of light produced by the beams 15 and 15' from the rotational axis of disc 31. Also, this signal will have a frequency equal to the rotational frequency of the disc 31 and a phase relationship which is a function of the direction of displacement of the spot. This will be true as long as the displacement is not greater than one diameter of the spot of light.

Adjustable optical means, which may be a laterally movable low power lens 43 mounted to intercept the beams 15 and 15' between focusing means 28 and chopping means 30 or contrarotating wedges 44 placed in optical alignment with colinearizing prism 10 to intercept beams 15 and 15' before they enter the prism, are utilized to laterally displace the point at which beams 15 and 15' are focused on disc 31. In this particular embodiment, the contrarotating wedges 44 are utilized and the laterally movable low power lens 43 is shown in the diagram simply as an alternate, but may be ignored for the following discussion. Contrarotating wedges 44 consist of a first wedge 45 and a second wedge 46 which are rotated simultaneously in opposite directions by means not shown. As is well known in the art, rotation of wedges 44 will cause light beams passing therethrough to be laterally displaced. Thus, rotation of wedges 44 will laterally displace beams 15 and 15' resulting in a lateral displacement of the point at which these beams are focused on disc 31 of chopping means 30. In the present invention wedges 44 are constructed so that the maximum displacement they can produce is approximately the maximum displacement expected due to star aberrations during a maximum possible change in velocity.

When the craft upon which the apparatus is mounted changes velocity in space, the spots of light produced by the beams from the two stars do not coincide at the rotational axis of disc 31. Since the beams 15 and 15' are focused at a spot slightly off center on disc 31, sensing means 41 will receive light which is modulated at the frequency of rotation of disc 31. The amplitude of this signal will be indicative of the amount of lateral displacement of the spot of light produced by beams 15 and 15' and the phase relationship of the frequency of the spot to the rotation of disc 31 will be a function of the direction of displacement of the spot. Sensing means 41 will convert this modulated light into an electrical signal which will appear on lead 42.

Lead 42 is connected to the input of an amplifier 47 which rejects the DC components of the signal and amplifies the AC components. The output of amplifier 47 is applied to the input of a full-wave synchronous detector 48 by means of a lead 49. Also applied to the fullwave synchronous detector 48 on lead 34 is the signal from signal generator 33 which is indicative of the rotary position of disc 31 in terms of the coordinate lying in the plane containing the lines of sight to the two stars. As is well known in the art, a full-wave synchronous detector compares the phase of an input signal and a reference signal applied thereto, and provides an output signal indicative of this phase relationship. Also, the output signal has a magnitude which is a function of the magnitude of the input signal. The output signal of detector 48 is indicative of the direction of lateral displacement, along the coordinate lying in a plane containing the lines of sight to the two stars, of the spot of light produced by focusing beams 15 and 15′ on disc 31. Since any lateral displacement of the light spot at disc 31 due to star aberration will be in the plane containing the lines of sight to the two stars, it is this displacement which is proportional to the change of velocity.

The output of the full-wave synchronous detector 48, which is indicative of the direction of displacement in a plane containing the two lines of sight to the stars and the amount of displacement in that direction, is applied to a second full-wave synchronous detector 70 by means of a lead 71. Also applied to full-wave synchronous detector 70 is a signal on lead 24 from signal generator 23. The signal on lead 24 is indicative of the star from which the light causing the signal on lead 71 is emanating. The full-wave synchronous detector 70 utilizes the signals on leads 24 and 71 to provide a signal on a lead 72 indicative of the lateral displacement of the light spots on disc 31 as well as the amount of displacement, and from which star the beams causing the displaced light spot are emanating. Actually the output signal from detector 70 is an indication of the difference in displacement of the two light spots along the coordinate lying in the plane containing the lines of sight to the two stars. However, since the light spot due to beams 11 and 11′ is maintained approximately centered on disc 31, this is simply the displacement of the light spot produced by beams 15 and 15′. The electrical signal on lead 72 is amplifier in an amplifier 73 and applied to a motor 74 on a lead 75. Motor 74 is mechanically connected to contrarotating wedges 44 and rotates these wedges until the signal on lead 75 is approximately zero. Thus, the amount of rotation of motor 74 is a direct indication of the amount of star aberration and, hence, the change in velocity of the craft. A precision encoder 76 is attached to motor 74 and provides a signal on a lead 77 indicative of the amount of rotation of motor 74. The signal on lead 77 may be in digital form or in analog form depending upon the use which is to be made of this signal.

The output of full-wave synchronous detector 48 on lead 71 is also applied to a gate circuit 80 by means of a lead 81 which is connected to lead 71. An enabling signal is applied to gate 80 on a lead 82. Lead 82 is connected to lead 24 of signal generator 23. Gate 80 is enabled by a signal on lead 82 whenever disc 22 of chopping means 20 is in a position to allow beams 11 and 11′ to pass. Thus, the output of gate 80 on a lead 83 is indicative of the displacement in a plane, containing the line of sight of both stars, of the spot of light due to beams 11 and 11′ impinging upon disc 31.

The amplified output of sensing means 41 on lead 49 is applied to a full-wave synchronous detector 85 by means of a lead 86, which is attached to lead 49. Also applied to the full-wave synchronous detector 85 is the quadrature signal output of signal generator 33 on lead 35. The signal on lead 35 is an indication of the position of disc 31 in terms of the coordinate which is perpendicular to the plane containing the lines of sight to the two stars. Full-wave synchronous detector 85 compares the phase of the signal on leads 86 and 35 and provides a signal on a lead 87 which is indicative of the amount and direction of displacement of the light spots at disc 31 along the coordinate which is perpendicular to the plane containing the lines of sight to the two stars. Lead 87 is connected to the input of a second full-wave synchronous detector 88. Also connected to full-wave synchronous detector 88 is an input lead 89 which is attached to the output lead 24, of signal generator 23. Full-wave synchronous detector 88 provides a signal on a lead 90 which is indicative of the difference between the lateral displacement, in a plane perpendicular to the plane containing the lines of sight to the two stars of the light spots at disc 31.

The output signal from full-wave synchronous detector 85 on lead 87 is also applied to a gate 91 by means of a lead 92 which is connected to lead 87. An enabling signal is applied to gate 91 on a lead 93 which is connected to lead 24. Gate 91 is enabled whenever disc 22 of chopping means 20 is in a position to allow the beams 11 and 11′ to pass. Thus, gate 91 provides a signal on a lead 94 indicative of the lateral displacement of the light spot produced by beams 11 and 11′ on disc 31 in a plane perpendicular to the plane containing the lines of sight to the two stars.

The signals on leads 83, 90, and 94 are utilized to stabilize the craft in space. That is, these signals are utilized to insure that the light beams 11 and 11′ are always focused into a light spot concentric with the rotational axis of disc 31. While leads 83, 90, and 94 are not shown as connected to any attitude control devices it should be noted that the signals on these leads are similar to the outputs of any attitude platform and may be utilized in a similar manner. Star aberrations due to changes in velocity of the craft will appear as a movement of the light spot produced by focusing beams 15 and 15′ on disc 31. This displacement is compensated by contrarotating wedges 44 and, thus, the rotation of wedges 44 is a direct indication of the change of velocity of the craft.

It can be seen that a highly accurate space velocity meter is disclosed which has the added advantage of providing attitude of the apparatus in space. Since velocity and attitude are obtained, this device can be utilized as a fully automatic, self-contained space navigation system.

While I have shown and described a specific embodiment of this invention, further modifications and improvements will occur to those skilled in the art. I desire to be understood, therefore, that this invention is not limited to the particular form shown, and I intend in the appended claims to cover all modifications which do not depart from the spirit and scope of this invention.

I claim as my invention:
1. A space velocity meter comprising:
(a) a colinearizing prism having the characteristic of simultaneously passing light beams from two light sources situated at given respective angles from said prism;
(b) adjustable optical means, mounted in the light path of one such light source, for displacing the light path of the source a variable amount in a desired direction upon proper energization;
(c) first chopping means, mounted in optical alignment with said prism, for alternately passing light from the two light sources and providing an electrical output signal indicative of the source of the light passing therethrough;
(d) mechanical chopping means rotatably mounted in optical alignment with said first chopping means for endowing the light passing therethrough with intensity and phase information indicative of the magnitude and direction of displacement from the rotational axis;
(e) sensing means mounted to receive the light passing through said mechanical chopping means, for providing an electrical output signal indicative of the inten- sity and phase of the light applied thereto;
(f) pickoff means connected to said mechanical chopping means for providing electrical signals indicating the rotational position of said mechanical chopping means in terms of a pair of orthogonal coordinates having the rotational axis of said mechanical chopping means as an origin and contained within the plane of the mechanical chopping means;
(g) means, connected to receive said electrical signals from said first chopping means, said sensing means and said pickoff means, for providing energization to said adjustable optical means sufficient to displace the light path of one of the sources to a position where the light beams from both sources coincide at said mechanical chopping means; and
(h) means attached to said adjustable optical means for providing an output signal indicative of an apparent change of angle between the two light sources.

2. A self-contained space navigation system comprising:
(a) a colinearization prism having the characteristic of simultaneously passing light beams from two stars situated at given respective angles from said prism;
(b) adjustable optical means, mounted in the light path of one star, for displacing the path of said star a variable amount in a desired direction upon proper energization;
(c) first chopping means, mounted in optical alignment with said prism, for alternately passing light from the two stars and providing an electrical output signal indicative of the star from which the light passing therethrough is emanating;
(d) mechanical chopping means rotatably mounted in optical alignment with said first chopping means for endowing the light passing therethrough with intensity and phase information indicative of the magnitude and direction of displacement from the rotational axis;
(e) sensing means, mounted to receive the light passing through said mechanical chopping means, for providing an eletcrical output signal indicative of the intensity and phase of the light applied thereto;
(f) pickoff means connected to said mechanical chopping means for providing electrical signals indicating the rotational position of said mechanical chopping means in terms of a pair of orthogonal coordinates having the rotational axis of said mechanical chopping means as an origin and contained within the plane of said mechanical chopping means;
(g) means connected to receive said electrical signals from said first chopping means, said sensing means and said pickoff means, for providing energization to said adjustable optical means sufficient to displace the light path of one of the stars to a position where the light beams from both stars coincide at said mechanical chopping means;
(h) means attached to said adjustable optical means for providing an output signal indicative of an apparent change of angle between the two stars; and
(i) means connected to receive the electrical signals from said pickoff means for providing outputs indicative of the attitude of said system in space.

3. A space velocity meter comprising:
(a) a colinearizing prism having the characteristic of simultaneously passing light beams from two light sources situated at given respective angles from said prism;
(b) first chopping means, mounted in optical alignment with said prism, for alternately passing light from the two light sources and providing an electrical output signal indicative of the source of the light passing therethrough;
(c) focusing means mounted in optical alignment with said prism and said first chopping means;
(d) mechanical chopping means, rotatably mounted at approximately the focal point of said focusing means, for endowing the light passing therethrough with intensity and phase information indicative of the magnitude and direction of displacement from the rotational axis;
(e) adjustable optical means mounted in optical alignment with said prism, for laterally displacing the point at which said focusing means focuses the light beams from one of the sources;
(f) sensing means, mounted to receive the light passing through said mechanical chopping means, for providing an electrical output signal indicative of the intensity and phase of the light applied thereto;
(g) pickoff means connected to said mechanical chopping means for providing electrical signals in quadrature indicative of the rotational position of said mechanical chopping means;
(h) means, connected to receive said electrical signals from said first chopping means, said sensing means and said pickoff means, for adjusting said optical means to a position where the light beams from both sources are focused at the same point; and
(i) means attached to said optical means for providing an output signal indicative of the apparent change of angle between the two light sources.

4. A self-contained space navigation system comprising:
(a) a colinearizing prism having the characteristic of simultaneously passing light beams from two stars situated at given respective angles from said prism;
(b) first chopping means, mounted in optical alignment with said prism, for alternately passing light from the two stars and providing an electrical output signal indicative of the star from which the light passing therethrough is emanating;
(c) focusing means mounted in optical alignment with said prism and said first chopping means;
(d) mechanical chopping means, rotatably mounted at approximately the focal point of said focusing means, for endowing the light passing therethrough with intensity and phase information indicative of the magnitude and direction of displacement from the rotational axis;
(e) adujstable optical means, mounted in optical alignment with said prism, for laterally displacing the point at which said focusing means focuses the light beams from one of the stars;
(f) sensing means, mounted to receive the light passing through said mechanical chopping means, for providing an electrical output signal indicative of the intensity and phase of the light applied thereto;
(g) pickoff means connected to said mechanical chopping means for providing electrical signals in quadrature indicative of the rotational position of said mechanical chopping means;
(h) means, connected to receive said electrical signals from said first chopping means, said detecting means and said pickoff means, for adjusting said optical means to a position where the light beams from both stars are focused at the same point;
(i) means attached to said optical means for providing an output signal indicative of an apparent change of angle between the two stars; and
(j) means connected to receive the electrical signals from said pickoff means for providing outputs indicative of the attitude of said system in space.

No references cited.

JEWELL H. PEDERSEN, *Primary Examiner.*

W. A. SKLAR, *Assistant Examiner.*